United States Patent [19]

Stokic

[11] 4,092,779

[45] June 6, 1978

[54] DEVICE FOR DETERMINING ANGLE RELATIONSHIPS OF OR BETWEEN PLANES

[76] Inventor: Bozidar M Stokic, 1/12 Woodstock Street, St. Kilda, Australia, 3182

[21] Appl. No.: 762,291

[22] Filed: Jan. 25, 1977

[30] Foreign Application Priority Data

Jan. 30, 1976 Australia ............................. PC4676

[51] Int. Cl.² ........................................... G01C 21/20
[52] U.S. Cl. ..................................... 33/1 SD; 33/1 E
[58] Field of Search ..................... 33/1 SB, 1 SD, 1 B, 33/76 VA, 78, 1 R, 1 E; 235/61 GM

[56] References Cited

U.S. PATENT DOCUMENTS

| | | | |
|---|---|---|---|
| 2,027,368 | 1/1936 | Bockius | 33/76 VA |
| 2,381,836 | 8/1945 | Noble | 33/1 SD |
| 2,717,448 | 9/1955 | Lubin et al. | 33/76 VP |
| 3,393,457 | 7/1968 | Freda | 33/78 |

FOREIGN PATENT DOCUMENTS

| | | | |
|---|---|---|---|
| 633,711 | 2/1928 | France | 33/76 VA |

Primary Examiner—Richard E. Aegerter
Assistant Examiner—John W. Shepperd
Attorney, Agent, or Firm—Shlesinger, Arkwright, Garvey & Dinsmore

[57] ABSTRACT

A device for determining angle relationships of or between planes, such as in geological structures, having a first member having on a planar surface thereof a family of concentric circles indicative of angles from the range 0° to 90°, the circles each being indicative of an angle that is the complement of the half-angle of a respective one of a family of notional right circular cones of equal height based on the surface concentrically of the circles and having a diameter corresponding to that of its circle; and means mounted on and extending across the surface, the means being rotatable with respect to the circles to permit correlation between (a) the angle of inclination of a plane in one direction as indicated by a circle and (b) the inclination of that plane in another direction, or another direction in which a particular inclination of the plane occurs.

7 Claims, 15 Drawing Figures

DEVICE FOR DETERMINING ANGLE RELATIONSHIPS OF OR BETWEEN PLANES

This invention relates to a device for determining angle relationships such as required, for example, in geological surveying to determine the angle of true dip or apparent dip of rock beds and the respective direction of dip.

Rock beds, for example of sedimentary origin, are said to dip when inclined to the horizontal; the angle of the dip being relative to a horizontal plane. The maximum angle of dip at which a particular bed is inclined to the horizontal is the true dip of the bed and that angle extends in a specific direction for the bed. Each lesser angle other than in a direction at right angles to the angle of true dip (the strike of the bed) is the apparent dip in a particular direction.

The out-crop of a bed, or other access to the bed, normally is such that true dip and/or its direction cannot be directly measured with accuracy. Given that the apparent dip in each of two directions has been measured, the true dip and its direction can be determined. Alternatively, if the angle of true dip and its direction are known the apparent dip in a particular direction or the direction in which a particular apparent dip will occur can be determined. However, such determinations typically involve either (a) tedious use of graphical scale representations from which the required data has to be obtained by measurement, with accuracy depending on the precision with which the representation is drawn and measured; (b) calculations based on and requiring repeated use of trigonometric function charts; or (c) a complex stepwise procedure using stereographic projection charts. Each of these methods is time consuming and, because of the relatively large number of steps necessary in each, is likely to result in the introduction of an error that only can be detected by duplication of the determination. Such methods therefore are not well suited to use on data from survey work where, typically, determination of, for example, true dip is required for hundreds of apparent dip readings in different sites and beds.

The present invention relates to, and seeks to provide a device which is relatively simple to use and which, therefore, may be employed, if required, on site. The device of the invention seeks to attain simplicity of use by providing a representation of true and apparent dip angles each as a separate component related to direction co-ordinates. The separate components may be presented on a single part of the device or they may be provided on separate, mutually rotatable parts.

The present invention provides for such device a first member having a planar surface, hereinafter referred to as a first sheet member for convenience, having on the planar surface a family of concentric half or full circles each circle of which is indicative of a successive respective angle from the range of 0° to 90°. The angles of which the circles are indicative are such that each angle is the complement of the half-angle of a respective one of a family of notional right circular cones of equal height based on said sheet concentrically with said circles.

In one aspect, a device according to the invention comprises a basal member having a planar surface on which said family of concentric half or full circles is defined or represented, and means mounted on and extending across said surface, said member being rotatable with respect to the basal member to permit correlation between the angle of inclination of a plane in one direction as indicated by a respective circle with the inclination of that plane in a second direction in the same plane as the one direction.

In one form of the first aspect, there is provided a device for determining angle relationships between planes, such as in geological structures, comprising a basal member having on a planar surface thereof a family of concentric half or full circles, each circle being indicative of a successive respective angle from the range of 0° to 90° and each angle being the complement of the half-angle of a respective one of a family of notional right circular cones of equal height based on said surface concentrically of said circles, and a ruler member mounted on the basel member so as to extend across that surface; the ruler member being mounted on the basal member so as to be laterally movable across the surface and rotatable thereon with respect to the circles. The ruler member is mounted on the basal member such that, during its lateral movement across the circles without rotation, a point intermediate the ends of the ruler member moves diametrically with respect to the circles; and such that, during rotation without lateral movement, that fixed point maintains a fixed relation with respect to the centre of the circles, i.e. it remains on the centre of the circles or traverses a circle concentric therewith.

In one arrangement, the ruler member is mounted on the basal member by at least one connecting member; the or each connecting member slidably engaging the basal member in a manner such that, during rotation of the ruler member, the or each connecting member moves with respect to the basal member concentrically of the family of circles. For practical considerations, the basal member may be such that the planar surface itself is circular, with the family of circles centered thereon and, in such case, the or each connecting member may slidably engage the basal member at or adjacent the periphery of that surface.

Where only a single connecting means is provided, that may extend to one side of the ruler member; the ruler and connecting members being rotatable in unison and the ruler member being laterally movable with respect to the connecting member. In such arrangement, the ruler member may have an elongate portion extending to one side thereof at a location intermediate its ends, the elongate portion being slidably engaged with the connecting member in a manner permitting such lateral movement, but precluding longitudinal movement of the ruler member relative to the connecting member.

In a modification of the foregoing aspect of the invention, the family of circles may be defined or represented on a first sheet member separate from the basal member. In such modification, the first sheet member may be non-rotatably mounted on the planar surface of the basal member, with the ruler member mounted so as to extend across the circles, as previously provided.

The first sheet member may be releasably mounted on the basal member, for example, by the sheet member being located within a surrounding rib or bead projecting above the planar surface. The periphery of the first sheet member and the rib or bead may have at least one interfitting portion so as to prevent rotation of the first sheet member with respect to the planar surface.

The present invention further provides for such device a second member having a planar surface, hereinafter referred to as a second sheet member for convenience, having on the planar surface a family of curved lines each defining at least part of a respective circle and being indicative of a respective angle from the range 0° to 90°. The curved lines are such that each passes through a common point with the respective circles being centered on a straight line passing through that common point. The angles of which the curved lines are indicative are such that each is the complement of the half-angle of a respective one of a family of notional right circular cones of equal height based on the second sheet with their bases centered on the common point and each having a radius equal to the diameter of the circle of the respective curved line.

In one particular useful form, the second sheet member has thereon a further such family of curved lines the common point of which is co-incident with that of the first-mentioned family of curved lines, with the respective circles of the curved lines of each family being centered on the same straight line. The arrangement may be such that one family of curved lines is the mirror image of the other, in which case each curved line indicative of a particular angle will have a counter-part in each family, with the respective circle being of the same diameter. However, such symmetry (about a line through the common point and tangential to all curves) need not be provided since, in some instances, it will be convenient to have the curved lines of each family indicative of a range of angles over different increments between successive curves (e.g. 5° and 10° increments, respectively) or overlapping equal increments (e.g. each at 10° increments starting from 5° and 10°, respectively).

According to a second aspect, the present invention comprises a said first and a second sheet member engageable in overlapping relation, with the centre of the circles of the first sheet being co-incident with the common point of the curved lines of the second sheet, and relatively rotatable in such relation; one of the sheets being transparent so that the other is visible therethrough.

In the case of geological strata or planes, the angles of which the concentric circles primarily are indicative are angles of true dip, but they may be indicative of apparent dip; while the angles of which the curved lines are indicative are angles of apparent dip.

One of the sheet members, most conveniently the first, may have thereon two mutually perpendicular co-ordinant lines intersecting at a point co-incident with the centre of the concentric circles. Alternatively, or additionally, the one of the sheets may have thereon a plurality of lines passing through such point and angularly spaced therearound, and/or indicia indicative of such angular spacing, from 0° to at least 180° and preferably from 0° to 360°. As a further alternative, such co-ordinant lines, angularly spaced lines and/or indicia may be provided on a third sheet. Such third sheet may be transparent and either overlie, or be between, the first and second sheets; or it may be substantially opaque with the first and second sheets both being transparent, and above the third sheet, such that all sheets are visible from the one side thereof.

The first and second sheets, and the third sheet where provided, may be engageable in overlapping relation by connecting means extending therethrough and permitting relative rotation. In one form, such connecting means may comprise a Chicago screw permitting separation of the sheets. Alternatively, the sheets may be fixed in overlapping relation (subject to the first sheet having thereon sufficient circles indicative of angles of substantially the full range of 0° to 90° or portions of that range on opposed sides thereof, with a respective second sheet over each of the opposed sides, as hereinafter will be explained), by means of a rivet. In a further arrangement, one of the sheets may be provided with a projection on which the other is snap-engageable by provision of a hole therein. In each instance, however, it will be appreciated from the description with reference to the accompanying drawings that such connecting means, as a matter of convenience, should not extend across the sheets so as to interfere with viewing of one sheet through the other(s).

In another form, the sheets, may be engageable in overlapping relation by at least one of the sheets being circular and located in a circular recess or depression of the other sheet. In such form, a laterally extending bead on the periphery of the one sheet may be provided to engage behind a bead of a raised edge defining the periphery of such recess or depression on the other sheet. Most conveniently, each sheet is circular with, in that case, the bead on the other sheet being provided around the inner circumference of a raised annular margin of that sheet.

In a still further form of the second aspect of the invention, the first and second sheets may be provided in association with a basal member in the manner described in relation to the first aspect of the invention. In that arrangement, a ruler member, as in the first aspect, may be mounted on the basal member so as to extend across the planar surface thereof. Alternatively, the family of concentric circles or of curved lines may be defined or represented on the planar surface.

The angles of which the concentric circles and the curved lines are indicative most conveniently span substantially all of the range of 0° to 90°. However, it will be appreciated from the foregoing that the full range cannot be indicated on a device of practical, finite dimensions. This problem can be accommodated in the case of the family of curved lines since, for lines indicative of very small angles, only a portion of the respective circles need be represented. In the case of the concentric circles, the problem can be satisfactorily resolved by representing the range in two portions and utilizing a different scale for the concentric circle representation of the angles of the two portions of the range. Additionally, very small angles such as less than 2°, and very large angles such as greater than 85°, are of limited significance in relation to geological strata and therefore may be ignored without undue inconvenience. However, even with the concentric circles, it is found that substantially the entire range of 0° to 90° can be satisfactorily represented on a first sheet member of a practical diameter; it being possible to represent the range of 5° to 90° with clarity on a first sheet of, for example, 8 to 10 inches in diameter, the centre being indicative of 90°.

The sub-range of angles of the two portions, where provided, may be angles above and below common value, such as above and below 30°. Alternatively, the sub-ranges conveniently may overlap, such as above 30° and below 40°; with the range of 30° to 40° being duplicated in the representation of each sub-range.

Each sub-range may be separately represented on a respective first sheet or on a respective side of the one first sheet. In such cases, there most conveniently may be a corresponding respective second sheet for each first sheet or each side of the one first sheet. Alternatively, it will be appreciated that the circles of one set of concentric circles on one side of a single first sheet each may be indicative of a respective angle of each sub-range. In the latter case, a single second sheet may be used, with each curved line thereof being indicative of a respective angle of each sub-range. In a further alternative, semi-circles of one half of a first family of concentric circles may be provided in conjunction with the other half of a second family of concentric circles, each family being centered on the one point and indicative of the angles of a respective sub-range.

The angles of the respective ones of the concentric circles or of the curved lines may be indicated by appropriate indicia. In the case of sub-ranges being represented by one family of circles and one family of curved lines, two sets of indicia can be provided, with the sets preferably being readily distinguished by a difference in stylization, size and/or colour.

In one form of the invention, it is possible to provide a family of concentric circles and a family of curved lines on a single sheet. However, this complicates use of the device for some applications, due for example to the inability to vary other than the direction co-ordinate in the range 0° to 360° such as may be represented on a rim portion of the device that is rotatable concentrically with respect to the family of circles.

In order that the invention and its use may be more readily understood, description now will be directed to the accompanying drawings, in which.

The true dip component may be derived by depicting the range of possible values of the true dip angle in all directions as projected onto a horizontal plane. Those angles thus may be so projected as a continuous series of concentric circles although, for convenience, only selected angles (for example at 5° or 10° intervals) need be projected with values between intervals being obtained by extrapolation.

Figures 1, 2, 5:
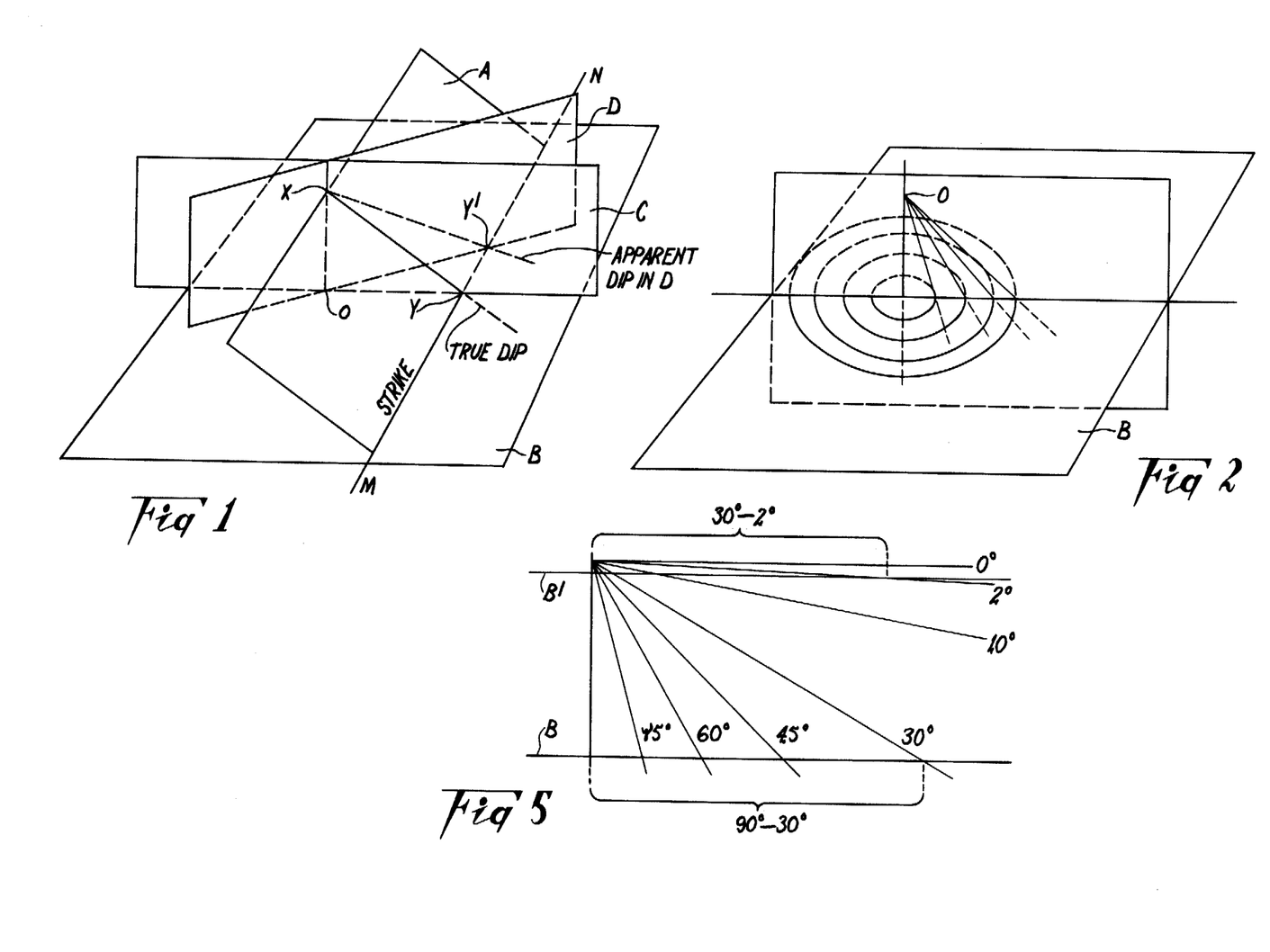
FIG. 1 is a schematic representation of a plane of a geological formation, such as a bedding plane, the plane of a fault or the like shown in relation to horizontal and vertical planes.
FIG. 2 illustrates schematically, from a consideration of FIG. 1, the derivation of the one of a family of concentric circles indicative of all formations corresponding to that of the formation of FIG. 1.
FIG. 5 illustrates a modified derivation of the family of concentric circles.

In FIG. 1 of the attached drawings, a surface of a rock bed is depicted by a plane A and is shown as intersecting horizontal plane B along a strike line MN. Vertical plane C intersects plane A and is perpendicular to the strike MN, such that angle OYX corresponds to the angle of true dip $\alpha$ of the bed rock; the direction of true dip, of course, being the horizontal direction of plane C. Vertical plane D intersects plane C at an angle, the intersection here being shown for convenience as being through line OX, and the angle OY'X is the angle of apparent dip of plane A in the horizontal direction of plane D.

If the strike is varied through 360° in plane B with respect to said point O, it will be apparent that XY will describe a cone and that Y will describe a circle centered on O; that circle constituting a projection of the cone depicting the true dip on a plane of all beds having a true dip of angle OYX (i.e. $\alpha$). In a similar manner, a family of concentric circles can be derived for all values of OYX between substantially the full range 0° and 90°, as shown in FIG. 2 for selected angles in that range.

Derivation of the apparent dip component is as follows. As in FIG. 3, the circle C depicting the projection of a true dip angle $\alpha$ through 360° in a horizontal plane (i.e. in all directions), shown in relation to N, S, E, and W directions, is considered. For a plane having that angle of true dip and a strike direction and true dip direction of PQ and RS, respectively, a line parallel to the strike (and hence normal to the true dip direction) can be drawn through point A on that circle to meet RS at point T. If a number of such planes having true dip directions 1 to 5, as shown in broken outline, are considered, it will be apparent that the corresponding respective positions of the point T will be at T(1) to T(5). The locus of point T for a continuous series of planes having a true dip direction varying from 0° to 90° (i.e. from due north to due east) will be a semi-circle C(1).

Figures 3, 6, 7, 10:
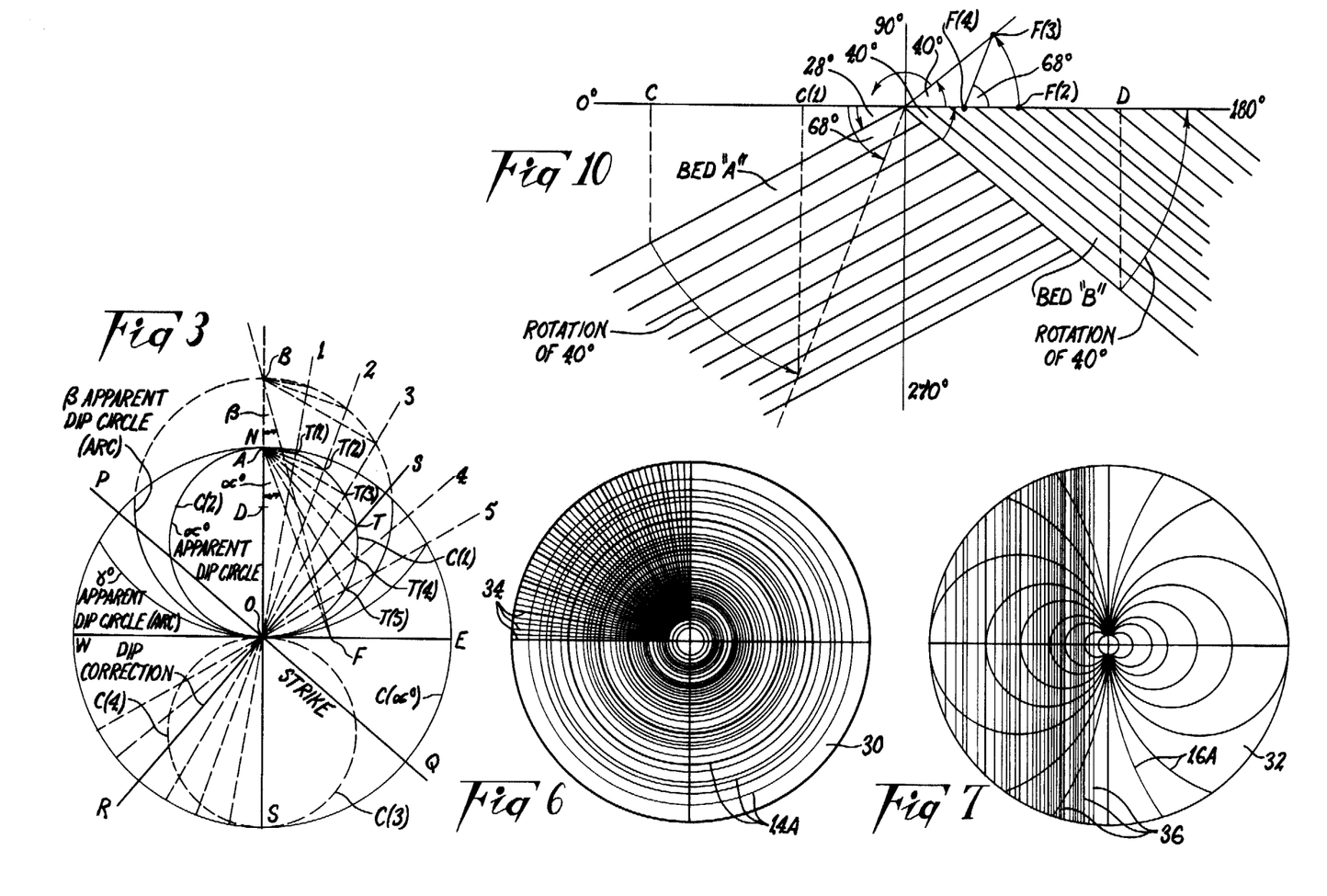
FIG. 3 illustrates schematically, again from a consideration of FIG. 1, the derivation of the one of a family of curved lines representing the locus of apparent dip components, represented with respect to a particular co-ordinate system, of all formations having a true dip corresponding to that of the formation of FIG. 1.
FIGS. 6 and 7 show modified forms of the device according to the present invention.
FIG. 10 is a schematic representation of a geological structure.

A similar semi-circle C(2,3,4) can be derived from a consideration of similar series of planes having true dip directions varying from 270° to 360°, 90° to 180° and 180° to 270°, and a similar relationship can be derived for each or any circle of the true dip projection. By this means, it therefore is possible to derive opposed families of circles (or, for practical reasons, portions thereof) all of which have their centers on a common direction line (here the N-S line, as this will be the direction line of greatest practical convenience) and all having a common tangent normal to that line. Only one of the two opposed families of circles is required for use with the or each set of true dip circles as will become apparent in the following.

Those families of circles, the diameters of each member of which is related to the diameter of a concentric true dip component circle, constitute the apparent dip component. It can be shown that, by super-imposition of those components as shown in FIG. 4, determinations of the above mentioned type can be made.

With further reference to FIG. 3, the procedure for constructing apparent dip curves for other true dip circles can be simplified by locating point F such that OAF is equal to $\alpha°$, the true dip angle indicated by circle C. Retaining points O and F fixed, the apparent dip curve for planes having an apparent dip of $\beta$ can be drawn by moving from point A to B, along OA, such that OBF equals $\beta$; OB being the diameter of the required curve for apparent dip of $\beta$, with the centre of that curve being the midpoint D, of OB.

Figure 4:
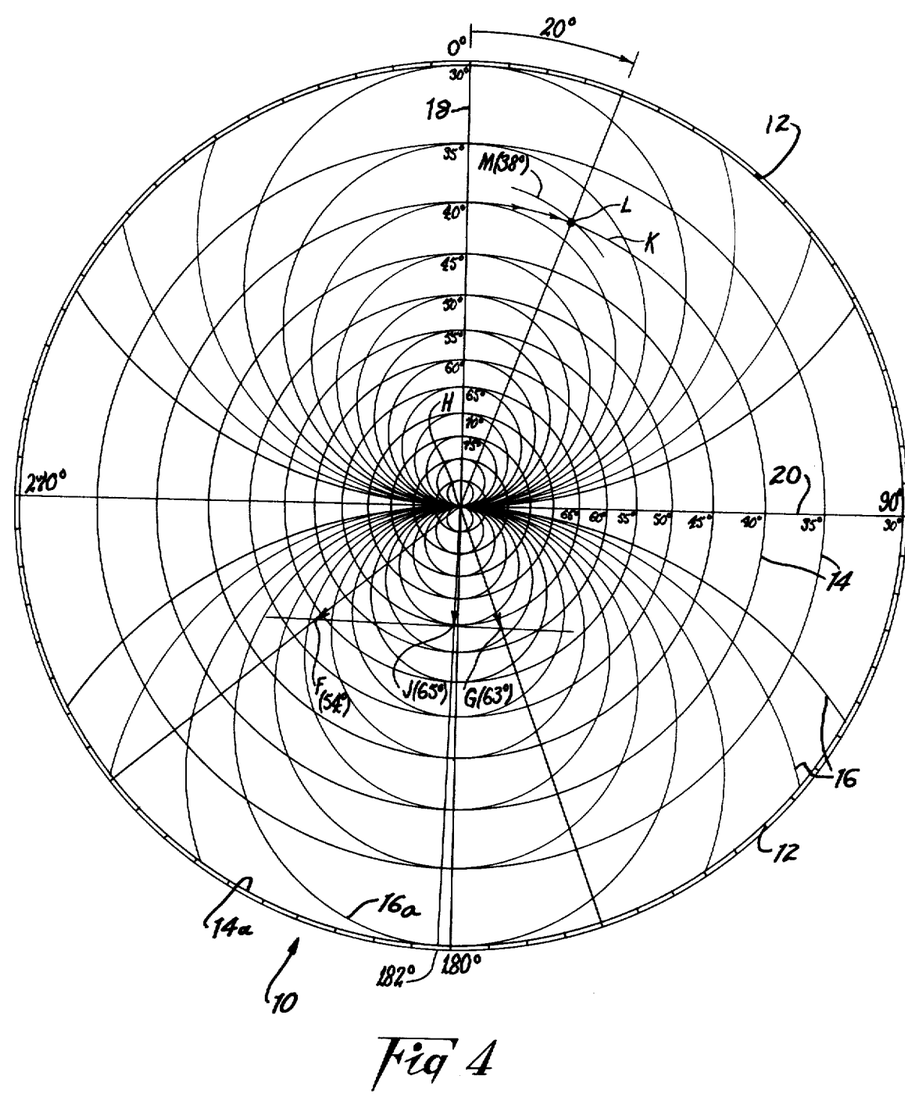
FIG. 4 illustrates at least part of a device according to the invention according to one form thereof.
Figure 8A:
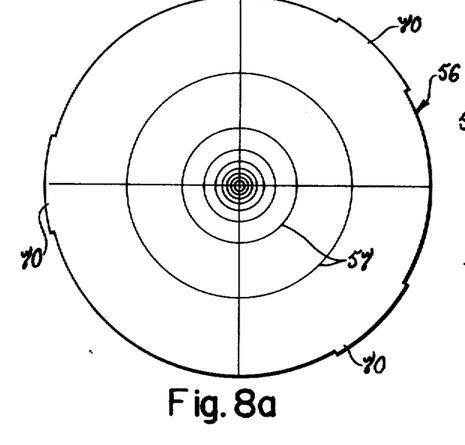
FIGS. 8a–e and 9 show in plan view and in section the components of a further form of a device according to the invention; the components being shown separately in FIG. 8 and in one form of assembly in FIG. 9.
Figure 8B:
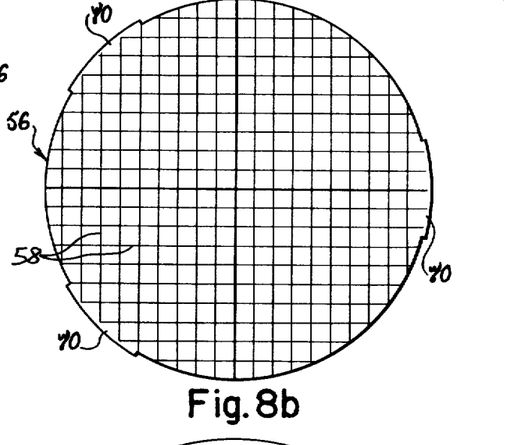
Figure 8C:
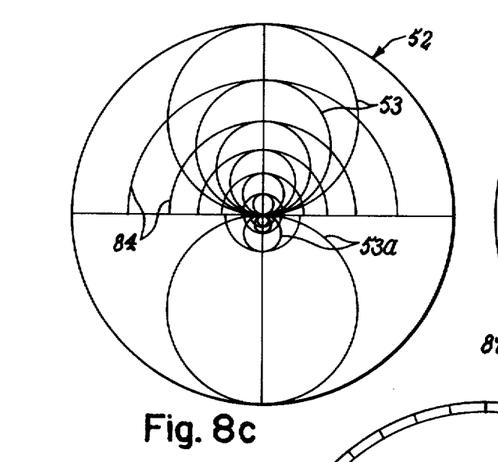
Figure 8D:
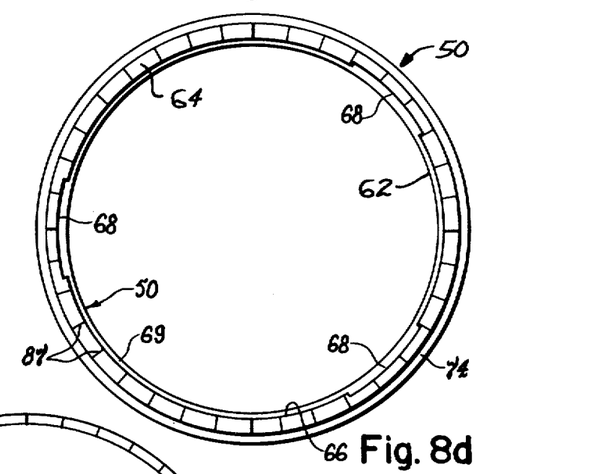
Figure 8E:
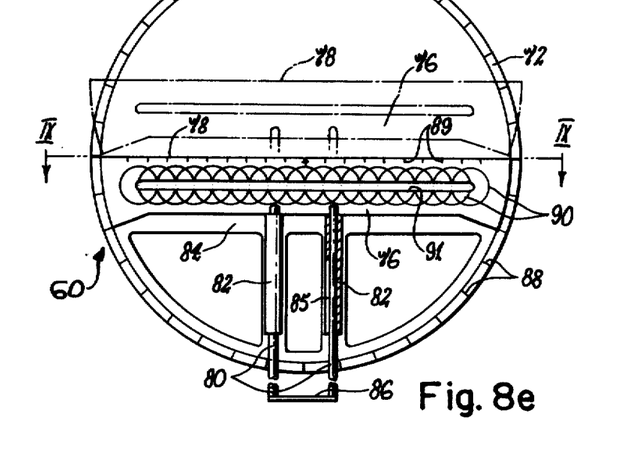

In FIG. 4, there is shown at least part of a device according to one form of the invention. This comprises a circular, flat disc or plate 10, constituting a fundamental plane, on which is marked by any suitable means the necessary data for angle and direction determinations. The data marking includes peripheral horizontal direction readings 12, from O (due N) through 360°; cencentric, true dip component circles 14 and apparent dip component circles (or sufficient parts thereof) 16. For convenience, N-S and E-W direction lines 18 and 20 also are shown.

In the form shown, the components 14 and 16 are depicted for angles from 30° to 85° and 0° to 85°, respectively. These interval markings within that range are shown for simplicity of the drawing only along half of the N-S line, rather than on both halves thereof and along the E-W line.

As will be appreciated from the foregoing derivation of components 14 and 16, the angle values from 30° to 85° relate to each component. Thus, respective circles 14a and 16a are 30° true dip and 30° apparent dip circles, respectively.

To illustrate the simplicity of use of the device, consideration now will be directed to solution of a typical problem:

Given that two apparent dip angles in a bed have been measured as being 54° in direction 230° (i.e. S50° W) and 63° in direction 160° (S20° E), determine the angle and direction of true dip.

For this determination, the points of intersection of the respective apparent dip directions and the true dip angle circles 14 are located; these being the points F and G. The normal to FG passing through the common centre H of component circles 14 and, the intersection J of that normal with FG, is located. The circle 14 passing through point J (or calculated from that circle 14 nearest point J) provides a reading of the true dip angle (approximately 65°) while the direction of OJ provides a reading of the true dip direction (approximately 182° or due S2° W).

Similar use may be made of the device for the determination of related quantities, as will be apparent from a consideration of the foregoing. For example, if the angle and direction of true dip is known, the directions of a particular apparent dip or the apparent dip in a particular direction can be determined.

Thus, for example, if it is required to determine the apparent dip angle in a direction at 20° to a true dip of 40° in a direction of 0° (due N), this may be read from the apparent dip circle intersecting the true dip circle of 40° in direction 20° (or 340°), if necessary by extrapolation from the nearest apparent dip circle. Thus the value of approximately 38° (when reading to the nearest degree) is obtained by moving through 20° along the 40° true dip circle K to locate point L and determining the angle value (38°) indicated by the apparent dip curve M passing through L, as shown in FIG. 4. If, in this problem, the true dip direction was other than due N or S, it would be necessary for the curved lines 16 and circles 14 to be represented on separate sheets, mutually rotatable through H; the problem then being solved by first aligning the known true dip direction on the sheet bearing the circles with the line on which the centres of curvature of lines 16 are located, and then proceeding as before. In the latter case, where separate sheets are provided, the upper sheet will need to be transparent to enable the other to be viewed therethrough.

It will be evident that the device of FIG. 4 could be modified to show true dip component circles from 0° to 90°; although this would present a problem either in providing a device of manageable diameter or one clearly showing the components 14 and 16 without recourse to inconveniently large angle intervals between the respective circles of those components. In view of these problems, it is convenient to break the 0° to 90° range for the true dip component circles into at least two portions in accordance with an arrangement apparent from a consideration of FIG. 1.

In FIG. 1, a second horizontal plane B' (not shown) nearer the point X than the plane B may be considered. That second plane B' can be used to obtain a series of circles, by projection of the cones generated by rotation of XY for different true dip angles about O that are on a lesser scale than the projection on plane B; and by appropriately selecting the spacing of that second plane from X, part ranges of the true dip angles may be obtained. Such is apparent from a consideration of FIG. 5, in which projection of sub-ranges of true dip angles on planes B and B' are shown. Convenient ranges are from 2° to 30° on plane B' and 30° to approximately 90° on plane B'.

In the form of device shown in FIG. 4, the two portions of the 0° to 90° range of the true dip component circles may be provided on a respective face of the disc or plate 10. As indicated, the two parts will be on a different respective scale of representation and the scale of the corresponding portions of the apparent dip component circles will be on the same respective scales. However, on each face of disc 10, the apparent dip circles over the necessary range of 0° to 90° (or conveniently 0° to approximately 85°) will be provided on each face or on a separate disc overlying each face.

Alternatively, the two portions may be designated on only one face of a disc or plate 10. In this form, the two portions will be represented by the same true dip and apparent dip circles but differentiated by two different angle interval scales.

The device also may include a further, transparent disc or plate overlying disc or plate 10 and rotatable thereon, for example by provision of a pin extending axially through each of the disc or plate 10 and the further such member. The latter may be provided with at least one radially extending line, or a series thereof spaced at uniform angular intervals, for the purpose of locating the points of intersection of direction lines (such as lines HF, HG and HJ in FIG. 4) with true or apparent dip circles. Additionally, the further disc or plate may be provided with a family of parallel chord lines, conveniently uniformly spaced, for locating a line such as FG. Together with the series of radial lines, the parallel lines can be utilized to locate a direction line such as HJ and its intersection J with a line such as FG. Alternatively, such radial and chordal lines may be provided on the disc or plate 10 or a respective one of the radial and chordal lines may be provided on each plate.

In an alternative form, shown in FIGS. 6 and 7, the device may be of a two part form in which the true dip component circles 14A and apparent dip component circles 16A are provided separate circular discs or plates 30, 32. As indicated above, the true dip circles may be provided in two portions, each on a respective face of disc 30 with there being a separate, corresponding disc 32 overlying each face and rotatable thereon about a central securing pin. Alternatively, the two portions of the true dip circles may be represented on a single face of disc 30, with the ranges of the two portions being designated by respective scale interval values. As a further alternative, the apparent dip disc 32 may be provided on each of its faces with a representation of apparent dip circles, with there being a respective true dip disc 30 overlying each face thereof, and with each side of the device having respective scale interval values.

In the manner described above in relation to the FIG. 4 form of the device, radial direction lines 34 and a set of parallel chord lines 36 may be provided. In the arrangements shown in FIG. 6, the former are provided on disc 30 (here shown for convenience of illustration only in one quadrant, rather than all quadrants) while the latter are provided on disc 32 (here shown for convenience of illustration only on one half, rather than both halves), although it will be appreciated that this arrangement may be reversed or that lines 34 and 36 may be provided on the one disc.

Figure 9:
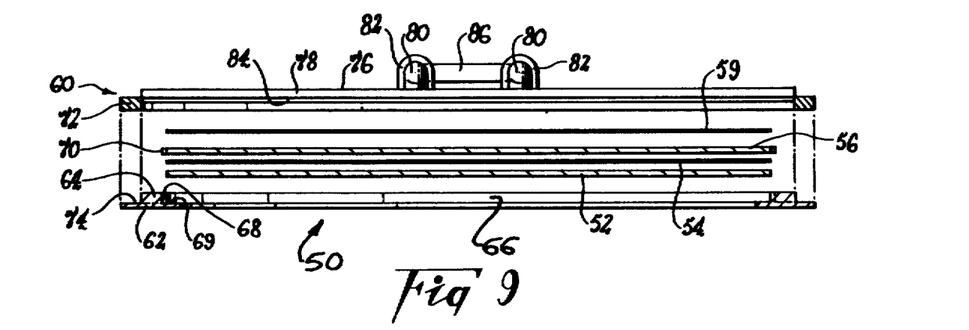

A device according to the invention is illustrated in FIGS. 8 and 9; with the major components being shown separately in FIGS. 8a to 8e, and together in an exploded view in FIG. 9. The device comprises a basal member 50, a transparent apparent dip disc 52 having families of curved lines 53 and 53a on one surface, a sheet of white paper 54, a transparent fundamental plane disc 56 having a family of curved lines 57 on one surface thereof and a grid 58 on the opposed surface, a sheet of translucent or transparent tracing paper 59 and a ruler member 60. The basal member includes an annular base 62 (which, alternatively, may be a circular disc), on which is formed a fixed ring 64. The ring defines an inner, circular shoulder 66, with there being at least one radially stepped portion 68 provided on shoulder 66 to provide locating means for preventing rotation relative to ring 64 and disc 56.

The discs 52 and 56 and sheets 54 and 59 are circular and are received neatly within ring 64 on radially inner flange 69 of base 62; the disc 52 and sheets 54 and 59 being rotatable within the ring 64. Disc 56 is provided at its periphery with at least one stepped portion 70, engageable with a stepped portion 68 of ring 64 to prevent rotation of disc 56 relative to the ring 64.

The ruler member 60 includes an annular ring 72 within which ring 64 of the basal member is concentrically receivable for relative rotation; the underside of ring 72 being supported on radially outer flange 74 of base 62. The ruler member also has a rule 76 extending across ring 72 such that edge 78 of the rule can be positioned diametrically of the ring 72, as shown.

The rule is rotatable with the ring 72, relative to ring 64, so as to be able to locate edge 78 on any diameter. The rule also is laterally movable and, for this purpose, it is mounted above the surface of ring 72 by means of lateral extension bars 80 secured to rule 76 being slidably engaged in guideway tubes 82 mounted on T-shaped support 84 located on ring 72. Thus, the rule may be moved laterally, such as to position edge 78 as shown in broken outline, by bars 80 being drawn through tubes 82. To enable full lateral movement of rule 76 across one-half of ring 72, the tubes 82 have slots 85 at their outer ends such that stop-bar 86 extending between bars 80 may be moved inwardly of the outer ends of the tubes.

In an alternative arrangement, the rule may be provided with a lateral extension which is engaged by tongue-and-groove interfitting relation with the T-shaped support 84. Such arrangement, it will be appreciated, also will permit lateral movement of the rule in the manner provided for by the sliding fit of extension bars 80 in guideway tubes 82.

As shown, ruler member 60 is transparent so that the discs and sheets below it are fully visible and so that rotational angle values 87 marked on ring 64 also are visible. The ring 72 also has rotational angle values 88 marked thereon to permit precise relative rotation of the ruler member 60 and the basal member 50 to be effected.

Additionally, the rule 76 has along edge 78 markings 89 providing an equal area net, and overlapping circles 90, such as may be required in a grid count for statistical analysis of structure units. An elongate slot 91 is provided in rule 76 to enable a count of units to be entered on sheet 54.

It will be appreciated that the components of the device may be readily separable, such as by rings 64 and 72 being snap-engageable in a manner permitting their relative rotation. Thus, a bead or projection on the inner surface of ring 72 may be snap-engageable into a groove in the outer surface of ring 64, or vice versa. Alternatively, the rings may simply engage by virtue of a firm sliding fit therebetween.

It is desirable that the basal member and rule member be separable to enable replacement of sheet 54 or 59; and to enable reversal of the order of the discs and/or sheets, as may be required in use of the device for particular applications. Sheets 54 and 59 enable data entered thereon to be viewed through disc 52 and, if transparent, through disc 56, by appropriate interpositioning of the discs and sheets. Moreover, construction lines or points, such as are indicated below in relation to FIG. 11, may be entered on sheet 59; the latter being in an upper-most position for this purpose and enabling the curves or circles of disc 52 or 56, respectively, or data entered on sheet 54 to be viewed therethrough.

To further illustrate the utility of the device, reference now is made to FIG. 10, in which there is depicted in a vertical section a possible geological structure. The structure comprises an old sedimentary bed A which, after tilting and weathering has been overlain by a new horizontally deposited bed B, and the whole structure tilted such that bed A has true a dip of 30° in the direction of 20° (N20E), and bed B has a true dip of 40° in the direction of 180° (due S). It is required to determine the attitude of bed A at the time bed B was deposited and, to make this determination, the structure of FIG. 10 is depicted on a fundamental, horizontal plane on a first sheet as shown in FIG. 11.

Figure 11:
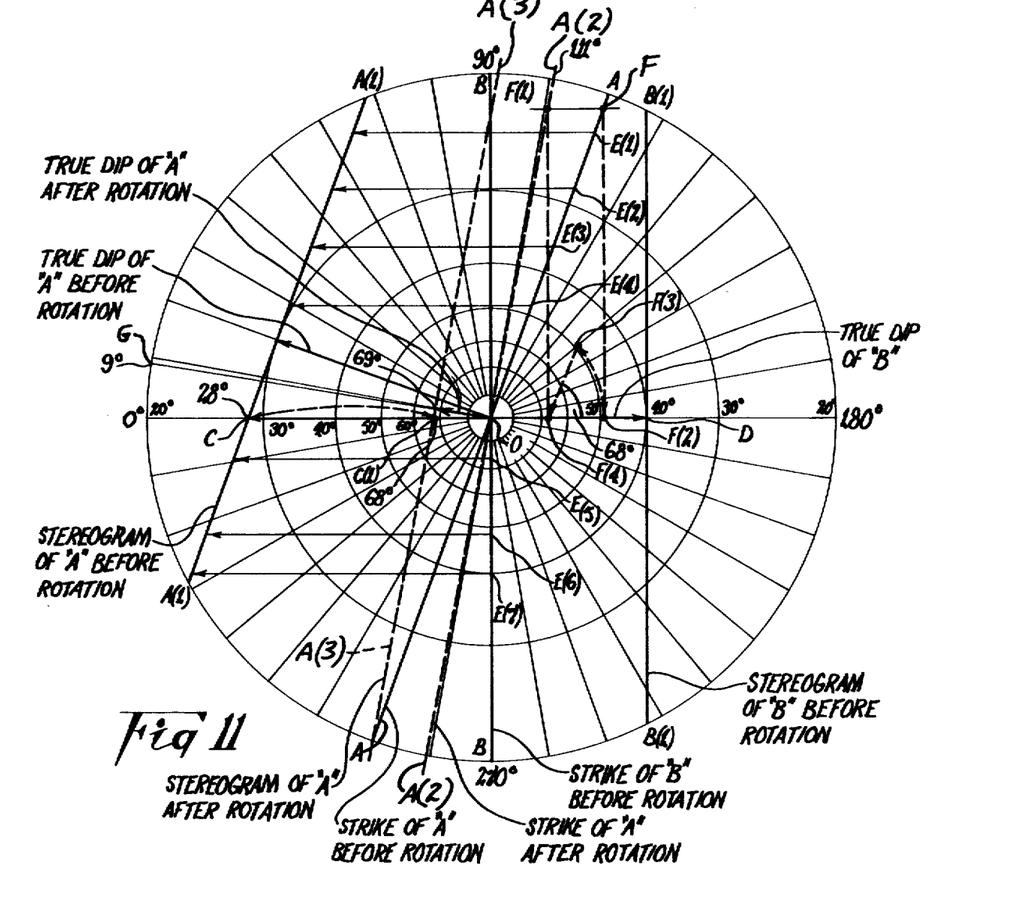
FIG. 11 shows a first sheet member, such as of the device of FIGS. 8 and 9, illustrating the solution of a problem relating to the structure of FIG. 10.

In FIG. 11, A—A and B—B are the strike directions of beds A and B, respectively; while the stereogram lines A(1)—A(1) and B(1)—B(1) are parallel to the strike directions and tangential to the respective one of the concentric circles indicative of the true dip angle of the beds.

The intersection of A(1)—A(1) with a radial line of the fundamental plane representation, in the direction of true dip of bed B, intersects at C the circle indicative of an angle of 28° which indicates the apparent dip of bed A in that direction. Relatively few circles are shown in FIG. 11, for simplicity, although the angle of 28° can be readily obtained by extrapolation. It therefore will be appreciated that the apparent dip of bed A along each of the arrows from points E(1) to E(7), which are parallel to the true dip direction of bed B, also will be 28°.

The required attitude of bed A may be derived by considering a 40° rotation of the geological structure of FIG. 10 as a whole, which is graphically determined on the fundamental plane of FIG. 11, to bring bed B into a horizontal deposition. For this purpose, the structure is considered as rotated on the line B—B, the strike line of bed B, and it will be appreciated that the portions of the structure to the South and to the North of B—B will rotate upwardly and downwardly, respectively.

Considering first lines OD and OC, it will be apparent that these will be rotated through 40°; point D moving upwardly into the fundamental plane, and point C moving downwardly. It therefore can be seen that, after rotation, the dip of bed A will be 68° (28 + 40) in the horizontal direction of OC, i.e. the direction of true dip of bed B before rotation, and the same will apply in the directions of the arrows from all points E(1) to E(7). This rotation is illustrated in FIG. 10, which shows the structure in section along lines OC and OD before and, in broken outline, after rotation; and, with respect to FIG. 11, point C will assume position C1 after rotation C1 being located by movement along OC, the true dip direction of bed B, to the point of intersection with the circle indicative of the angle 68° (28 + 40).

Thus, it is known that the apparent dip of bed A in its attitude of the time of deposition of bed B was 68° along the line of the present true dip direction of bed B (i.e. due North).

Next the location of the strike line of bed A after rotation, line A(2)—A(2), is to be determined. Considering an arbitrary point F on the strike line A—A of bed A, it will be appreciated that this point also will be rotated through 40° (upwardly with the point as shown) with respect to B—B. To derive the position F(1) of a corresponding point on strike line A(2)—A(2) of bed A after rotation, first F is projected onto the line OD to locate the point F(2), the line F-F(2) being parallel to B—B. It is then convenient to mentally rotate the vertical plane containing OD, which is depicted in FIG. 10, about OD through a turn of 90° so that it lies in the fundamental plane and to consider the strike and true dip directions of bed B as the vertical and horizontal axes of the rotated vertical plane. F(3) can then be located by movement from F(2) through an arc of 40° (corresponding to the 40° rotation). Now, as bed A dips at 68° in the horizontal direction of the plane, a line may be drawn through F(3) at an angle of 68° to the horizontal to obtain the intersection F(4) of that line with the horizontal axis; F(4) being the projection of point F(1) on the vertical plane. Thus, reverting to consideration of the fundamental plane as horizontal without the presence of the rotated vertical plane, a line through F(4) parallel to B—B is drawn to locate F(1); F(1) being the intersection of the line through F(4) parallel to B—B with a line parallel to the true dip of bed B before rotation and passing through F.

Having located points C(1) and F(1), a diameter through F(1) and the origin O may be drawn to obtain A(2)—A(2), the strike direction of bed A after rotation and a line may be drawn through C(1) parallel to A(2-)—A(2) to obtain the stereogram line A(3)—A(3). A radial line OG normal to A(2)—A(2) then is drawn to obtain the direction of true dip of bed A after rotation; the true dip angle being the angle indicated by the circle to which the stereogram line A(3)—A(3) is tangential. That circle passes through the point H at which A(3-)—A(3) intersects OG. Thus, it is found that the attitude of bed A at the time of deposition of bed B was such that its strike direction was approximately 101° (E11°S) and its true dip is approximately 69° in the direction 9°(N9°E).

In use of the present invention to solve this problem, the ruler member is moved laterally, i.e. parallel to B—B to enable F-F(2) and, later, F(4)-F(1) to be drawn. Similarly, the ruler member is positioned on the diameter passing through S68° E and then advanced laterally to obtain the line F(3)-F(4) parallel to that direction. Finally, the ruler member is successively positioned to obtain the diameter co-incident with O-F(1) to enable A(2)—A(2) to be drawn; the diameter normal to O-F(1) to obtain O-G; and, parallel to O-F(1) to obtain the steregram A(3)—A(3) through C(1) and, hence, point H.

The disc or discs of the device may be made of a variety of materials, although plastics materials are considered to be the most suitable and economical. Where lines or circles are to be viewed through a superimposed disc then, obviously, a transparent material is to be used and, indeed, all discs may be transparent (particularly where lines or circles are provided on only one side). However, where lines or circles are to be provided on two sides of a disc, it is convenient to use an opaque material for such disc to avoid confusion in use. Additionally, the lines or circles of different types may be differentiated by colour.

Finally, it is to be understood that various alterations, modifications and/or additions may be introduced into the constructions and arrangements of parts previously described without departing from the spirit or ambit of the invention.

Having now described my invention, what I claim as new and desire to secure by Letters Patent is:

1. A device for determining angle relationships between planes, such as in geological structures, comprising:

a disc member having two opposed planar surfaces;

a family of concentric circles on one of said planar surfaces each of said circles indicating an angle from at least part of the range from 0° to 90° which is the complement of the half angle of one of a family of notional right circular cones of equal height, each of said circles being the base of the cone of which the angle it indicates is the complement of the half angle;

a family of curved lines on one of said planar surfaces, each of the curved lines of said family passing through a common point coincident with the common center of said family of concentric circles and each of said curved lines being a portion of a circle each of which has its center on one common line extending radially from the common point;

each of said curved lines indicating an angle from at least part of the range from 0° to 90° which is the complement of the half angle of one of a family of notional right circular cones of equal height, each cone having a base with a radius equal to the diameter of the curved line which indicates the complement of the half angle for that cone;

a base member on which said disc member is rotatably mounted, said base member having thereon a horizontal bearing degree scale;

a ruler member extending across said disc member having a ruler edge thereon; and means for mounting said ruler member on said base member, said mounting means including means for rotating said ruler member with respect to said planar surfaces of said disc member and said base member and said mounting means including means for lateral movement of said ruler member with respect to said planar surfaces of said disc member and said base member.

2. A device according to claim 1 wherein said family of concentric circles and said family of curved lines are provided on the same planar surface of said disc member.

3. A device according to claim 1 wherein said family of concentric circles is located on one of said planar surfaces of said disc member and said family of curved lines is located on the other of said planar surfaces of said disc member, and said disc member is transparent so that both of said families can be viewed from one side of said disc member in overlapping relation.

4. A device for determining angle relationships between planes, such as in geological structures, comprising:

a first disc member having planar surfaces;

a family of concentric circles on one of said planar surfaces of said first disc member each of said circles indicating an angle from at least part of the range from 0° to 90° which is the complement of the half angle of one of a family of notional right circular cones of equal height, each of said circles being the base of the cone of which the angle it indicates is the complement of the half angle;

a second disc member having planar surfaces;

a family of curved lines on one of said planar surfaces of said second disc member, each of the curved lines of said family passing through a common point and each of said curved lines being a portion of a circle each of which has its center on one common line extending radially from the common point, each of said curved lines indicating an angle from at least part of the range from 0° to 90° which is the complement of the half angle of one of a family of notional right circular cones of equal height, each cone having a base with a radius equal to the diameter of the curved line which indicates the complement of the half angle for that cone;

a base member on which said first and second disc members are mounted with the center of said family of concentric circles being coincident with the common point of said family of curved lines, one of said disc members being rotatably mounted on said base member and the other being non-rotatably mounted on said base member, said base member having thereon a horizontal bearing degree scale in relation to which one of said disc members is rotatable;

a ruler member extending across said first and second disc members and having a ruler edge thereon;

means for mounting said ruler member on said base member, said mounting means including means for rotating said ruler member with respect to said planar surfaces of said disc members and said base member and said mounting means including means for lateral movement of said ruler member with respect to said planar surfaces of said disc members and said base member; and at least one of said first and second disc members being transparent so that said family of concentric circles and said family of curved lines can be viewed from one side of said disc members in overlapping relation.

5. A device according to claim 4 wherein said base member includes a support surface for said first and second members and a circular ring projecting above said surface, said ring having an inner circular shoulder within which one of said disc members is rotatable, said shoulder and the circumference of the other of said disc members each having at least one radially stepped portion, said stepped portion being engaged to thereby prevent rotation of said other disc member relative to said base member.

6. A device according to claim 5 wherein said means for lateral movement of said ruler member includes an elongate member extending laterally from said ruler member at a right angle to said ruler edge, said lateral movemement means also including a guideway positioned on said mounting means, said ruler member being laterally movable by sliding said elongate member along said guideway.

7. A device according to claim 5 wherein said circular ring of said base member includes an outer circular shoulder and said means for rotating said ruler member includes a ring portion which is telescopically received on said outer circular shoulder so as to be rotatable with respect to said base member.

* * * * *